US012739010B2

(12) United States Patent
Hong

(10) Patent No.: US 12,739,010 B2
(45) Date of Patent: Sep. 15, 2026

(54) INFORMATION TRANSMISSION METHOD AND APPARATUS, COMMUNICATION DEVICE, AND STORAGE MEDIUM

(71) Applicant: Beijing Xiaomi Mobile Software Co., Ltd., Beijing (CN)

(72) Inventor: Wei Hong, Beijing (CN)

(73) Assignee: Beijing Xiaomi Mobile Software Co., Ltd., Beijing (CN)

(*) Notice: Subject to any disclaimer, the term of this patent is extended or adjusted under 35 U.S.C. 154(b) by 788 days.

(21) Appl. No.: 18/013,835

(22) PCT Filed: Jul. 21, 2020

(86) PCT No.: PCT/CN2020/103348

§ 371 (c)(1),
(2) Date: Dec. 29, 2022

(87) PCT Pub. No.: WO2022/016394

PCT Pub. Date: Jan. 27, 2022

(65) Prior Publication Data

US 2023/0327740 A1 Oct. 12, 2023

(51) Int. Cl.
*H04B 7/00* (2006.01)
*H04B 7/06* (2006.01)

(52) U.S. Cl.
CPC ................................ *H04B 7/06952* (2023.05)

(58) Field of Classification Search
CPC ... H04B 7/06952; H04W 36/00; H04W 72/54
See application file for complete search history.

(56) References Cited

U.S. PATENT DOCUMENTS

| | | | | |
|---|---|---|---|---|
| 11,304,066 | B1 * | 4/2022 | Parihar | H04W 16/28 |
| 2013/0336112 | A1 | 12/2013 | Liu et al. | |
| 2014/0254515 | A1 * | 9/2014 | Kim | H04B 7/06952 370/329 |
| 2016/0043792 | A1 | 2/2016 | Jeong et al. | |
| 2018/0167883 | A1 * | 6/2018 | Guo | H04W 52/0216 |
| 2019/0239135 | A1 * | 8/2019 | Levitsky | H04B 7/088 |
| 2019/0260456 | A1 * | 8/2019 | Zhou | H04L 1/18 |

FOREIGN PATENT DOCUMENTS

| | | | | |
|---|---|---|---|---|
| CN | 106374984 A | | 2/2017 | |
| CN | 107113041 A | | 8/2017 | |
| CN | 107454645 A | | 12/2017 | |
| CN | 110024299 A | * | 7/2019 | H04W 72/23 |
| CN | 110603742 A | | 12/2019 | |
| CN | 110753388 A | | 2/2020 | |
| CN | 111148120 A | | 5/2020 | |

OTHER PUBLICATIONS

Supplemental Chinese Search Report issued on Dec. 5, 2023 for Chinese Patent Application No. 2020800016376.
Qualcomm Incorporated, "UL Timing adjustment on UE beam switch", 3GPPRAN4#90-Bis, R4-1904329, Xi'an, China, Apr. 8 -12, 2019.
Chinese Office Action issued on Jun. 19, 2023 for Chinese Patent Application No. 202080001637.6.

* cited by examiner

*Primary Examiner* — Ping Y Hsieh
(74) *Attorney, Agent, or Firm* — Volpe Koenig

(57) ABSTRACT

An information transmission method, apparatus and computer readable medium. The method comprising a first communication node sending to a second communication node a handover request that indicates handover from a first beam to a second beam, wherein the first beam is different from the second beam.

20 Claims, 9 Drawing Sheets

INFORMATION TRANSMISSION METHOD AND APPARATUS, COMMUNICATION DEVICE, AND STORAGE MEDIUM

CROSS-REFERENCE TO RELATED APPLICATION

The present application is a U.S. National Stage of International Application No. PCT/CN2020/103348, filed on Jul. 21, 2020, the contents of all of which are incorporated herein by reference in their entirety.

BACKGROUND

Supporting a large number of antenna units with controllable directions at a transmitter and a receiver is a key feature of the 5th generation (5G) new radio (NR). The millimeter (mm) Wave has been introduced into the 5G NR communication, and a terahertz frequency band will be widely applied in predictable 6G communication.

SUMMARY

In view of this, the embodiments of the present disclosure provide an information transmission method and apparatus, a communication device, and a storage medium.

According to a first aspect of an embodiment of the present disclosure, there is provided an information transmission method applied to a first communication node, the method including:

sending a switching request indicating switching from a first beam to a second beam to a second communication node, where the first beam is different from the second beam.

According to a second aspect of an embodiment of the present disclosure, there is provided an information transmission method applied to a second communication node, the method including:

receiving a switching request indicating switching from a first beam to a second beam, the switching request sent by a first communication node, where the first beam is different from the second beam.

According to a third aspect of an embodiment of the present disclosure, there is provided a communication device, including a processor, a memory, and executable programs stored in the memory and may be executed by the processor, where when executing the executable programs, the processor performs the steps of the information transmission method according to the first aspect or the second aspect.

It should be understood that the above general description and the following detailed description are only exemplary and explanatory, and cannot limit the embodiments of the present disclosure.

BRIEF DESCRIPTION OF THE DRAWINGS

The accompanying drawings are incorporated into the specification and constitute a part of the specification, show embodiments consistent with the present invention, and are used to explain the principle of the embodiments of the present invention together with the specification.

DETAILED DESCRIPTION

Exemplary embodiments will be described in detail here, and examples thereof are shown in the accompanying drawings. When the following descriptions refer to the figures, the same numbers in different figures indicate the same or similar elements, unless otherwise indicated. The implementations described in the following examples do not represent all implementations consistent with the embodiments of the present invention. Instead, they are merely examples of apparatuses and methods consistent with some aspects of the embodiment of the present invention as detailed in the appended claims.

The terms used in the embodiments of the present disclosure are only for the purpose of describing specific embodiments, and are not intended to limit the embodiments of the present disclosure. The terms "a/an," "said," and "the" in the singular form used in the embodiments of the present disclosure and the appended claims are also intended to include the plural form unless otherwise clearly indicated in the context. It should be further understood that the term "and/or" used in the present disclosure refers to and includes any or all possible combinations of one or more of the associated listed items.

It should be understood that although the terms 'first', "second," "third," etc. may be used in the embodiments of the present disclosure to describe various information, the information should not be limited to these terms. These terms are merely used to distinguish the same type of information from one another. For example, without departing from the scope of the embodiments of the present disclosure, the first information may also be referred to as second information, and similarly, the second information may also be referred to as first information. Depending on the context, the word "if," as used here, may be interpreted as "when," "upon," or "in response to determining."

In a high frequency band, a plurality of antenna units can be used for beam forming to reduce the width of a single beam to expand a signal coverage distance of the single beam. At the same time, in order to increase a signal coverage angle, for example, the signal covers the entire cell, the 5G system design introduces the concept of multi-beam.

The present application relates to the technical field of radio communications, but is not limited to the technical field of radio communications, and in particular, to an information transmission method and apparatus, a communication device, and a storage medium.

Figure 1:
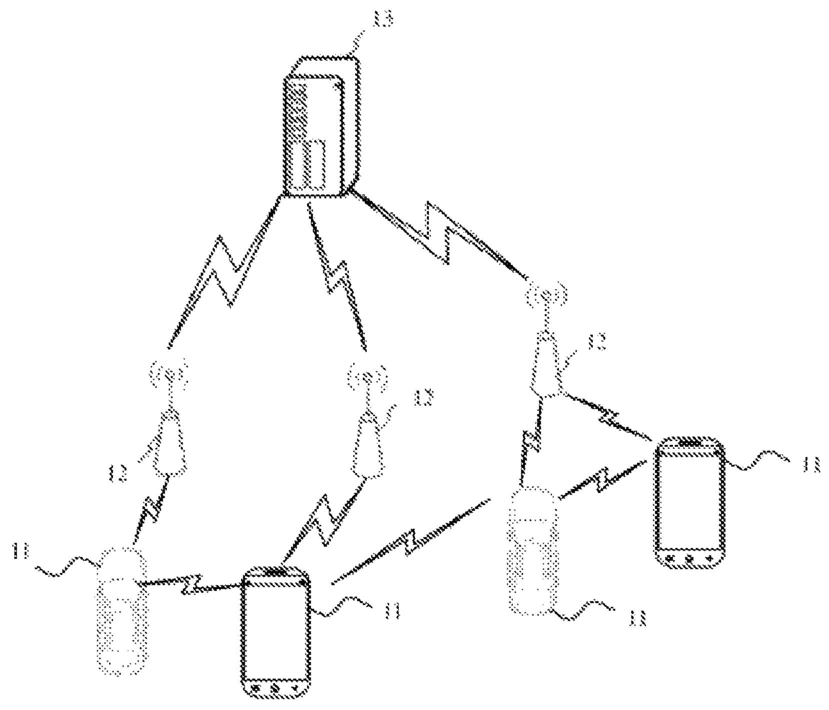
FIG. 1 is a schematic structural diagram of a communication system according to an example.

Referring to FIG. 1, which shows a schematic structural diagram of a radio communication system according to an embodiment of the present disclosure. As shown in FIG. 1, the radio communication system is a communication system based on a cellular mobile communication technology and may include: a plurality of terminals 11 and a plurality of base stations 12.

The terminal 11 may refer to a device for providing voice and/or data connectivity for a user. The terminal 11 may be in communication with one or more core networks via a radio access network (RAN), and the terminal 11 may be an Internet of Things terminal, such as a sensor device, a mobile phone (or "cellular" phone), and a computer having the Internet of Things terminal, for example, may be a fixed, portable, pocket, handheld, computer built-in, or vehicle-mounted apparatus. For example, a station (STA), a subscriber unit, a subscriber station, a mobile station, a mobile, a remote station, an access point, a remote terminal, an access terminal, a user apparatus, a user agent, a user equipment (UE), or a user terminal. Or the terminal 11 may also be an unmanned aerial vehicle device. Or the terminal 11 may also be a vehicle-mounted device. For example, it may be a trip computer having a radio communication function, or may be a radio communication device connected to the trip computer externally. Or the terminal 11 may also be a roadside device. For example, it may be a street lamp having the radio communication function, a signal light, or other roadside devices.

The base station 12 may be a network side device in the radio communication system. The radio communication system may be the 4th generation mobile communication technology (4G) system, also referred to as a long term evolution (LTE) system; or, the radio communication system may also be a 5G system, also referred to as a new radio (NR) system or a 5G NR system. Or the radio communication system may also be a next generation system of the 5G system. An access network in the 5G system may be referred to as a new generation-radio access network (NG-RAN). Or an MTC system.

The base station 12 may be an evolved base station (eNB) used in the 4G system. Or the base station 12 may also be a base station using a centralized distribution architecture (gNB) in the 5G system. When the base station 12 uses the concentrated distribution architecture, a central unit (CU) and at least two distributed units (DU) are usually included. The central unit is provided with protocol stacks of a packet data convergence protocol (PDCP) stratum, a radio link control (RLC) protocol stratum, and a media access control (MAC) stratum; and the distributed unit is provided with a protocol stack of a physical (PHY) stratum, and the embodiments of the present disclosure do not limit the specific implementations of the base station 12.

Radio connection between the base station 12 and the terminal 11 may be established by means of a radio air interface. In different implementations, the radio air interface is a radio air interface based on the 4th generation mobile communication network technology (4G) standard, or the radio air interface is a radio air interface based on the 5th generation mobile communication network technology (5G) standard, for example, the radio air interface is a new radio; or the radio air interface may also be a radio air interface based on a further next generation mobile communication network technology standard of 5G.

In an embodiment, end to end (E2E) connection may further be established between the terminals 11. For example, scenarios such as vehicle to vehicle (V2V) communication, vehicle to infrastructure (V2I) communication, and vehicle to pedestrian (V2P) communication in vehicle to everything (V2X) communication.

In an embodiment, the above radio communication system further includes a network management device 13.

A plurality of base stations 12 are connected with the network management device 13, respectively, where the network management device 13 may be a core network device of the radio communication system. For example, the network management device 13 may be a mobility management entity (MME) in an evolved packet core network (EPC), or the network management device may also be other core network devices, such as a serving gateway (SGW), a public data network gateway (PGW), a policy and charging rules function (PCRF) unit, or a home subscriber server (HSS). The embodiments of the present disclosure do not limit an implementation form of the network management device 13.

The execution subjects involved in the embodiments of the present disclosure include, but are not limited to: user equipment UE such as a terminal using a cellular mobile communication technology for communication, a base station, etc.

Figure 2:
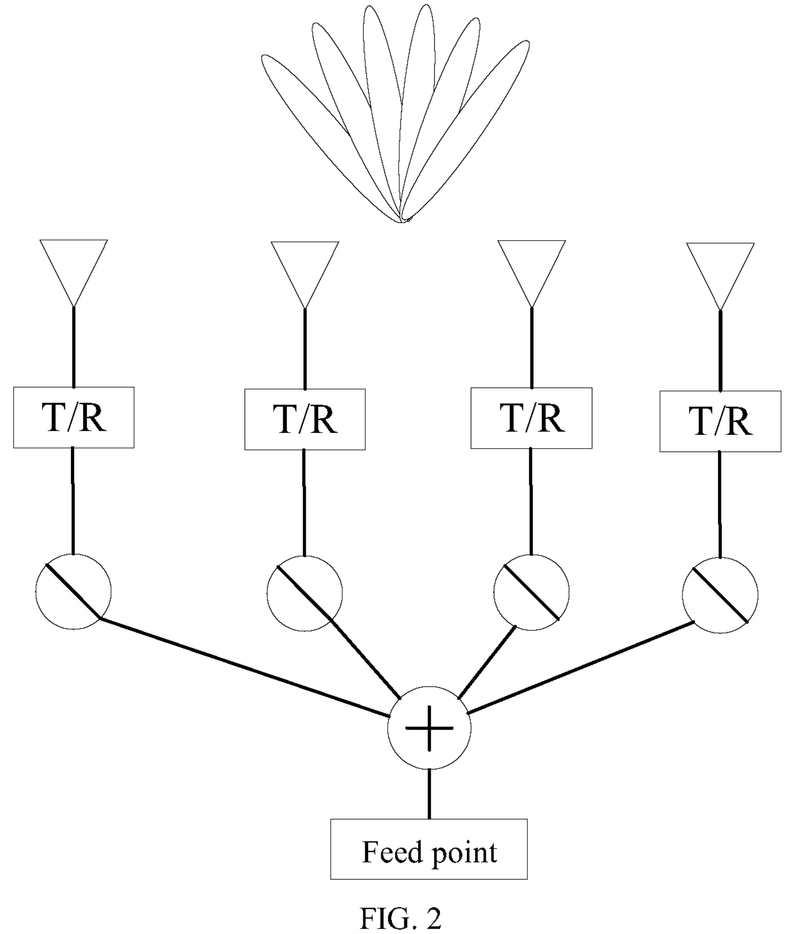
FIG. 2 is a schematic diagram of beam forming according to an example.
Figure 3:
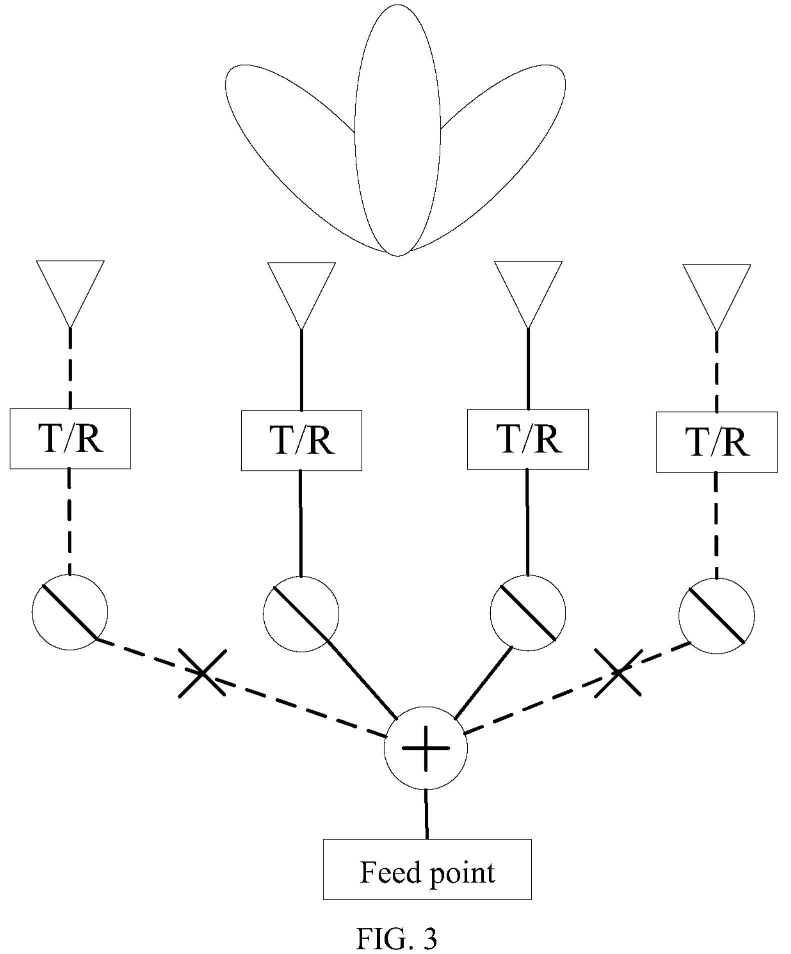
FIG. 3 is a schematic diagram of another beam forming according to an example.

An application scenario of the embodiment of the present disclosure is that, in order to achieve beam forming, UE requires a plurality of antenna units, as shown in FIG. 2 below, and four antenna units form a wider beam. Turning off some antenna units, as shown in FIG. 3. After turning off two antenna units, a wider beam can be obtained. A narrower beam has good directivity and concentrated energy and is applicable to the transmission of large data volume with poor channel conditions.

When UE users have good channel conditions and do not need to transmit a large amount of data, the narrower beam is unnecessary. If the beam is switched to the wider beam, not only will it save power because fewer antenna units are used, but also the mobility performance will become better due to the larger width. Therefore, it is very beneficial for the terminal to turn off some antenna units.

UE has different beam switching capacities. After beam switching, the first UE can ensure the consistency of beam pointing before and after switching. That is, before the beam switching, the peak gain directions of beams before and after switching are basically the same, or are less than a certain range. The directions of the peak gain of the beam before switching the second UE beam and the peak gain of the beam after switching the width will exceed a certain range, thus reducing signal transmission performance.

Figure 4:
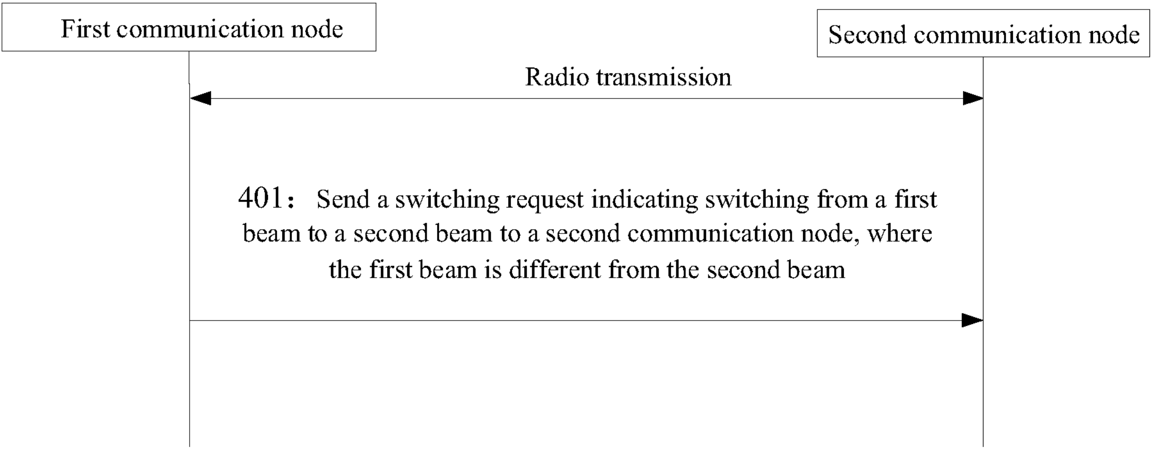
FIG. 4 is a schematic flowchart of an information transmission method according to an example.

As shown in FIG. 4, an embodiment provides an information transmission method that may be applied to a first communication node of radio communication, and the information transmission method may include:

S401: sending a switching request indicating switching from a first beam to a second beam to a second communication node, where the first beam is different from the second beam.

Herein, the first communication node can be UE, such as a terminal using a radio communication technology, such as a cellular mobile communication technology for communication, and the second communication node can be the UE or a base station in cellular mobile communication.

Both the first communication node and the second communication node can support the use of beam forming to generate beams for communication.

Herein, the first beam and the second beam may be beams in which the first communication node receives a signal transmitted by the second communication node. The first beam and the second beam may also be beams in which the first communication node sends the signal. The first beam may be different from the second beam in directivity or energy concentration, etc. For example, the number of antenna units required for the first beam is different from that required for the second beam; or the width of the first beam is different from that of the second beam. The first beam can be the current beam, and the second beam can be the switched target beam.

The first beam and the second beam can be used for communication in different scenarios. For example, the first beam is a wider beam, and the second beam is a narrower beam.

The first communication node can determine whether to perform beam switching according to the current communication scenario. For example, when a relative moving speed between the first communication node and the second communication node is relatively fast, the first communication node can select the wider beam.

The first communication node can send a switching request to indicate that the first communication node should switch from the first beam to the second beam.

After receiving the switching request, the second communication node determines whether to indicate the transmission of the second beam, or to configure the resource of the second beam.

So, the first communication node implements beam switching by sending the switching request. On the one hand, the first communication node can select different beams, which are not limited to the same type of beams for communication, so as to improve the flexibility of beam selection. On the other hand, the first communication node can select a beam suitable for the current communication scenario to communicate, thereby improving the communication efficiency.

In an embodiment, the switching request includes a beam change indication for indicating a difference between the first beam and the second beam.

Herein, a difference between the first beam and the second beam can be the difference in pointing and widths of the first beam and the second beam.

The second communication node can determine whether to allow the first communication node to switch from the first beam to the second beam according to the beam change indication. For example, the second communication node can determine whether there will be interference with beams of other communication nodes, and whether to allow the first communication node to switch from the first beam to the second beam according to the width of the second beam, etc.

In an embodiment, in response to the switching request including the beam change indication, the beam change indication is used to indicate that the first beam is wider than the second beam or the first beam is narrower than the second beam.

The first beam can be the beam shown in FIG. 2, and the second beam can be the beam shown in FIG. 3; or the first beam can be the beam shown in FIG. 3, and the second beam can be the beam shown in FIG. 2. The width of the first beam is different from that of the second beam.

Herein, the wider beam uses fewer antenna units, while the narrower beam uses more antenna units.

The wider beam can use fewer antenna units to save more power. Moreover, as the width becomes wider, the mobility performance will become higher.

The narrower beam can use a large number of antenna units to implement stronger directivity, more concentrated energy, and higher anti-interference capacity, and can be applicable to communication transmission with poor channel conditions.

For example, the current beam of the first communication node is the wider beam, the channel conditions under the current beam conditions are poor, there is a large amount of traffic data to be transmitted, and the first communication node can apply, to the second communication node, to switch to the narrower beam.

In another example, the current beam of the first communication node is the narrower beam, and the channel condition of the first communication node is good. For example, when a path loss estimated by the downlink of the second communication node is low, or a signal-to-noise ratio is greater than a certain value, and it is judged that the transmitted traffic is small, the first communication node can apply, to the second communication node, to switch to the wider beam.

In an embodiment, in response to the switching request including the beam change indication, the beam change indication is used for indicating a difference value between a width of the first beam and a width of the second beam.

The beam change indication can indicate the change of the second beam relative to the first beam. For example, the beam change indication can indicate the increase or decrease of the width of the second beam relative to the first beam, and the difference value of the change of the width of the second beam relative to the first beam.

Herein, the difference value can be a specific width difference value or a proportional relationship between the width of the second beam and the width of the first beam.

For example, as shown in Table 1, the beam change indication can indicate whether the width of the second beam increases or decreases relative to the width of the first beam through one bit, and indicate the proportional relationship between the width of the second beam and the width of the first beam through another one bit, that is, a width change factor.

TABLE 1

| Bit 1 0 represents that the width decreases, 1 represents that the width increases | Bit 2 Width change factor, 0 represents that the factor is 2, and 1 represents that the factor 4 | Width of second beam |
|---|---|---|
| 0 | 0 | Width of first beam/2 |
| 0 | 1 | Width of first beam/4 |
| 1 | 0 | Width of first beam * 2 |
| 1 | 1 | Width of first beam * 4 |

So, the difference of the beam before and after switching can be explicitly indicated by the beam change indication.

In an embodiment, the switching request includes capacity information indicating the capacity of the first communication node.

The capacity of the first communication node can include: the beam width switchable by the first communication node, and the control capacity in beam pointing when switching from the first beam to the second beam. The second communication node can judge whether to run beam switching based on the capacity of the first communication node.

In an embodiment, in response to the switching request including the capacity information, the capacity information indicating the capacity of the first communication node is used to indicate that the first communication node has the capacity to ensure the consistency of beam orientations before and after switching, or that the first communication node does not have the capacity to ensure the consistency of beam orientations before and after switching.

Figure 5:
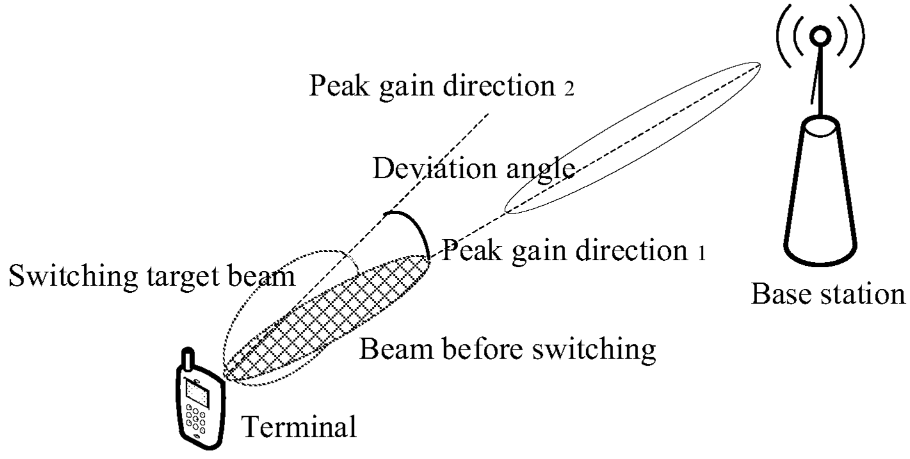
FIG. 5 is a schematic diagram of beam switching according to an example.

Different first communication nodes have different beam switching capacities. In an embodiment, after beam switching, the first communication node can ensure that the beam pointing after switching is consistent with the beam pointing before switching, the peak gain directions before and after the beam switching are basically consistent, or a deviation of the peak gain directions before and after the beam switching is less than or equal to a deviation threshold. As shown in FIG. 5, in another embodiment, after the first communication node performs beam switching, a deviation angle of the peak gain directions before and after the beam switching is greater than the deviation threshold.

If the deviation of the peak gain directions before and after the beam switching is greater than or equal to the deviation threshold, that is, the deviation angle between the peak gain direction of the second beam and the second communication node after switching is relatively large, thus reducing signal transmission quality.

So, the first communication node requests to use the second beam to perform beam sweeping through beam sweeping request information, and determines a second beam that meets transmission requirements. Thus, the inconsistency of the peak gain directions before and after switching generated by beam type switching may be reduced, so as to further improve the signal transmission efficiency.

In an embodiment, the switching request includes beam sweeping request information, and the beam sweeping request information is used for requesting a sweeping resource using the second beam to perform beam sweeping.

The first communication node can carry the beam sweeping request information in the switching request to request beam management from the second communication node. Herein, the beam management refers to that the first communication node uses a plurality of second beams to sweep a reference signal and other signals transmitted by the second communication node, determines a second beam whose signals meet a preset condition, and uses the second beam as a beam for communication between the first communication node and the second communication node.

The beam sweeping request information can be used to request sweeping resources for beam sweeping from the second communication node. Herein, the sweeping resources can include time slot resources for frequency sweeping, frequency resources, etc.

After the second communication node receives the switching request, if beam switching is allowed, the sweeping resources for the second beam sweeping can be determined.

The capacity information of the first communication node can be used as one beam sweeping request information. For example, the capacity information sent by the first communication node indicates that the deviation between the peak gain direction of the beam before beam switching and the peak gain direction of the beam after beam switching by the first communication node is less than or equal to the deviation threshold. After receiving the beam sweeping request information, the second communication node can determine that the first communication node needs to sweep the second beam.

Through the beam sweeping, the second beam with the highest signal quality can be determined for the communication between the first communication node and the second communication node to improve communication quality.

In an embodiment, the method further includes:

receiving a switching response sent by the second communication node, the switching response carrying resource information indicating the sweeping resource;

Performing the beam sweeping by using at least one second beam on the sweeping resource, determining the second beam whose sweeping results meet a first condition as a beam for communication between the first communication node and the second communication node.

Herein, the second communication node can indicate the sweeping resources for beam sweeping through the resource information carried in the switching response. The sweeping resources can include: time slot resources for frequency sweeping, frequency resources, etc.

After receiving the switching response, the first communication node determines the sweeping resources. In addition, on the sweeping resources, performing the beam sweeping by using at least one second beam, determining the second beam whose sweeping results meet a first condition as a beam for communication between the first communication node and the second communication node. Herein, the sweeping result can be signal quality parameters of the reference signal and other signals transmitted by the second communication node and determined by sweeping with the second beam, such as the reference signal receiving power (RSRP), RSRQ, SINR, etc.

For example, the first communication node can use the second beam to sweep to determine a second beam with the best RSRP, and use the information transmission for communication between the first communication node and the second communication node.

So, the first communication node uses the second beam for beam sweeping and determines a second beam that meets the transmission requirements. Thus, the inconsistency of the peak gain direction before and after switching due to the beam type switching may be reduced, so as to improve the signal transmission efficiency.

In an embodiment, the method further includes:

receiving a signal transmission indication information sent by the second communication node in response to the first communication node switching to the second beam; and determining a configuration for transmitting a signal on the second beam according to the signal transmission indication information.

After the first communication node completes beam switching, the second communication node can also send to the first communication node the configuration of the corresponding transmission signal readjusted according to the second beam, such as signal transmission power configuration, etc. Herein, the transmission power configuration can include measurement interval time configuration of mobility management, signal transmission power configuration, etc.

The first communication node performs data communication on the second beam based on the power configuration. For example, signal measurement is performed according to the measurement interval time configured by the power configuration. Thus, the power control demand is met to further save electric quantity.

In an embodiment, the step of sending a switching request to a second communication node to request a switch from a first beam to a second beam comprises at least one of the following:

sending the switching request to the second communication node in response to the electric quantity of the first communication node is lower than an electric quantity threshold;

sending the switching request to the second communication node in response to the first communication node being at a predetermined position; and sending the switching request to the second communication node in response to the first communication node being located at the predetermined position, and a historical beam used by the first communication node at the predetermined position is the second beam.

For example, due to the need for power saving and when the electric quantity is lower than the electric quantity threshold, the first communication node can apply to the second communication node to switch from the first beam to the second beam. Herein, the first beam is narrower than the second beam. Therefore, the number of antenna units used by the first beam is larger, and more electric quantity is consumed.

In another embodiment, the first communication node can determine the type of beam to be used according to its location. For example, at a location close to the second communication node, a wider beam can be used, and at a location far from the second communication node, a narrower beam can be used. In this way, the signal receiving efficiency can be improved. The first communication node judges whether to apply for beam switching to the second communication node according to the location, and the terminal position information can be measured according to GPS or other location measurement units.

In another embodiment, the first communication node can determine the beam to be used according to the historical usage record of the beam type at the location. For example, when the current beam type of the first communication node is different from the historical beam type of the current location, beam switching can be applied to the second communication node.

In an embodiment, the method further includes:

receiving the switching response sent by the second communication node in response to the requested information, where the switching response is used to indicate that switching to the second beam is allowed; and communicating with the second communication node on the second beam in response to receiving the switching response.

The second communication node can determine whether to allow the first communication node to switch from the first beam to the second beam according to the beam change indication. For example, the second communication node can determine whether there will be interference with beams of other communication nodes, and whether to allow the first communication node to switch from the first beam to the second beam according to the width of the second beam, etc. The second communication node can also determine whether to allow the first communication node to switch from the first beam to the second beam according to its own load. For example, when the load of the second communication node is greater than the load threshold, the first communication node is not allowed to switch from the first beam to the second beam. The second communication node can also determine whether to allow the first communication node to switch from the first beam to the second beam according to the capacity of the first communication node. For example, when the beam management capacity of the first communication node is weak, that is, when the deviation between the peak gain direction of the beam before the first communication node performs beam switching and the peak gain direction of the beam after the first communication node performs beam switching is greater than or equal to the deviation threshold, and the first communication node does not carry the beam sweeping request information in the switching request, the first communication node is not allowed to switch from the first beam to the second beam.

The second communication node can send the switching response indicating that the beam switching is allowed. After receiving the switching response, the first communication node switches from the first beam to the second beam. If no switching response indicating that the beam switching is allowed is received, the beam switching may not be performed.

Figure 6:
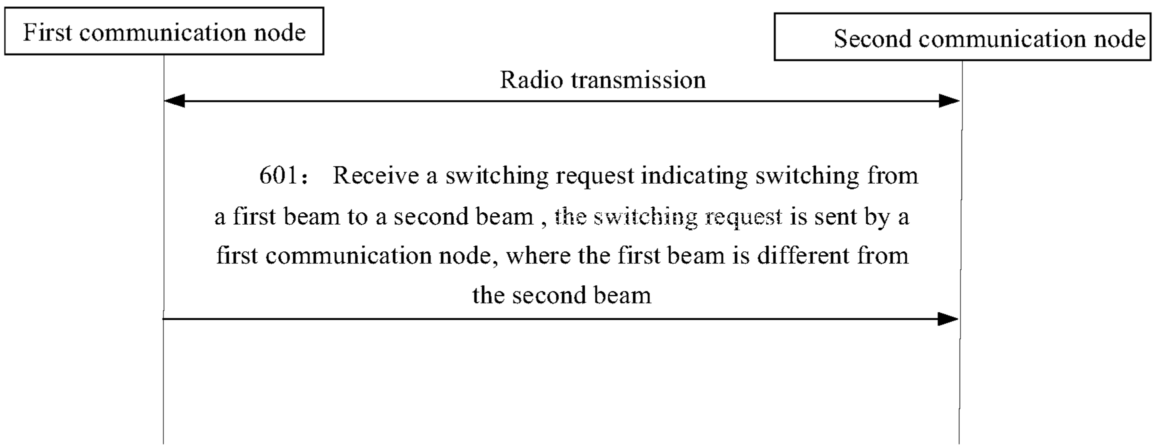
FIG. 6 is a schematic diagram of another downlink information transmission according to an example.

As shown in FIG. 6, an example provides an information transmission method that may be applied to a second communication node of radio communication, and the information transmission method may include:

S601: receiving a switching request indicating switching from a first beam to a second beam, the switching request is sent by a first communication node, where the first beam is different from the second beam.

Herein, the first communication node can be UE, such as a terminal using a radio communication technology, such as a cellular mobile communication technology for communication, and the second communication node can be the UE or a base station in cellular mobile communication.

Both the first communication node and the second communication node can support the use of beam forming to generate beams for communication.

Herein, the first beam and the second beam may be beams in which the first communication node receives a signal transmitted by the second communication node. The first beam and the second beam may also be beams in which the first communication node sends the signal. The first beam may be different from the second beam in directivity or energy concentration, etc. For example, the number of antenna units required for the first beam is different from that required for the second beam; or the width of the first beam is different from that of the second beam. The first beam can be the current beam, and the second beam can be the switched target beam.

The first beam and the second beam can be used for communication in different scenarios. For example, the first beam is a wider beam, and the second beam is a narrower beam.

The first communication node can determine whether to perform beam switching according to the current communication scenario. For example, when a relative moving speed between the first communication node and the second communication node is relatively fast, the first communication node can select the wider beam.

The first communication node can send a switching request to indicate that the first communication node should switch from the first beam to the second beam.

After receiving the switching request, the second communication node determines whether to indicate the transmission of the second beam, or to configure the resource of the second beam.

So, the first communication node implements beam switching by sending a switching request. On the one hand, the first communication node can choose different beams, which are not limited to the same type of beams for communication, so as to improve the flexibility of beam selection. On the other hand, the first communication node can select a beam suitable for the current communication scenario to communicate, thereby improving the communication efficiency.

In an embodiment, the switching request includes a beam change indication for indicating a difference between the first beam and the second beam.

Herein, a difference between the first beam and the second beam can be the difference in pointing and widths of the first beam and the second beam.

The second communication node can determine whether to allow the first communication node to switch from the first beam to the second beam according to the beam change indication. For example, the second communication node can determine whether there will be interference with beams of other communication nodes, and whether to allow the first communication node to switch from the first beam to the second beam according to the width of the second beam, etc.

In an embodiment, in response to the switching request including the beam change indication, the beam change indication is used to indicate that the first beam is wider than the second beam or the first beam is narrower than the second beam.

The first beam can be the beam shown in FIG. 2, and the second beam can be the beam shown in FIG. 3; or the first beam can be the beam shown in FIG. 3, and the second beam can be the beam shown in FIG. 2. The width of the first beam is different from that of the second beam.

Herein, the wider beam uses fewer antenna units, while the narrower beam uses more antenna units.

The wider beam can use fewer antenna units to save more power. Moreover, as the width becomes wider, the mobility performance will become higher.

The wider beam can use a large number of antenna units to implement stronger directivity, more concentrated energy, and higher anti-interference capacity, and can be applicable to communication transmission with poor channel conditions.

For example, if the current beam of the first communication node is the wider beam, the channel conditions under the current beam conditions are poor, there is a large amount of traffic data to be transmitted, and the first communication node can apply to the second communication node to switch to the narrower beam.

In another example, the current beam of the first communication node is the narrower beam, and the channel condition of the first communication node is good. For example, when a path loss estimated by the downlink of the second communication node is low, or a signal-to-noise ratio is greater than a certain value, and it is judged that the transmitted traffic is small, the first communication node can apply, to the second communication node, to switch to the wider beam.

In an embodiment, in response to the switching request including the beam change indication, the beam change indication is used for indicating a difference value between a width of the first beam and a width of the second beam.

The beam change indication can indicate the change of the second beam relative to the first beam. For example, the beam change indication can indicate the increase or decrease of the width of the second beam relative to the first beam, and the difference value of the change of the width of the second beam relative to the first beam.

Herein, the difference value can be a specific width difference value or a proportional relationship between the width of the second beam and the width of the first beam.

For example, as shown in Table 1, the beam change indication can indicate whether the width of the second beam increases or decreases relative to the width of the first beam through one bit, and indicate the proportional relationship between the width of the second beam and the width of the first beam through another one bit, that is, a width change factor. So, the difference of the beam before and after switching can be explicitly indicated by the beam change indication.

In an embodiment, the switching request includes capacity information for indicating the capacity of the first communication node.

The capacity of the first communication node can include a beam width switchable by the first communication node, and a control capacity in beam pointing when switching from the first beam to the second beam. The second communication node can judge whether to run beam switching based on the capacity of the first communication node.

In an embodiment, in response to the switching request including the capacity information, the capacity information indicating the capacity of the first communication node is used to indicate that the first communication node has the capacity to ensure the consistency of beam orientations before and after switching, or that the first communication node does not have the capacity to ensure the consistency of beam orientations before and after switching.

Different first communication nodes have different beam switching capacities. In an embodiment, after beam switching, the first communication node can ensure that the beam pointing after switching is consistent with the beam pointing before switching, the peak gain directions before and after the beam switching are basically consistent, or a deviation of the peak gain directions before and after the beam switching is less than or equal to a deviation threshold. As shown in FIG. 5, in another embodiment, after the first communication node performs beam switching, a deviation angle of peak gain direction before and after the beam switching is greater than or equal to a deviation threshold. If the deviation of the peak gain directions before and after the beam switching is greater than or equal to the deviation threshold, that is, the deviation angle between the peak gain direction of the second beam and the second communication node after switching is relatively large, thus reducing signal transmission quality.

So, the first communication node requests to use the second beam to perform beam sweeping through beam sweeping request information, and determines a second beam that meets transmission requirements, thus, the inconsistency of the peak gain directions before and after switching generated by beam type switching may be reduced, so as to further improve the signal transmission efficiency.

In an embodiment, the method further includes:

receiving the switching request carrying beam sweeping request information, where the beam sweeping request information is used for requesting a sweeping resource using the second beam to perform beam sweeping.

The first communication node can carry the beam sweeping request information in the switching request to request beam management from the second communication node. Herein, beam management refers to the first communication node using a plurality of second beams to sweep a reference signal and other signals transmitted by the second communication node, determine a second beam whose signals meet a preset condition, and use the second beam as the beam for communication between the first communication node and the second communication node.

The beam sweeping request information can be used to request a sweeping resource for beam sweeping from the second communication node. Herein, the sweeping resources can include time slot resources for frequency sweeping, frequency resources, etc.

After the second communication node receives the switching request, if beam switching is allowed, the sweeping resources for the second beam sweeping can be determined.

The capacity information of the first communication node can be used as one beam sweeping request information. For example, the capacity information sent by the first communication node indicates that the deviation between the peak gain direction of the beam before beam switching and the peak gain direction of the beam after beam switching by the first communication node is less than or equal to the deviation threshold. After receiving the beam sweeping request information, the second communication node can determine that the first communication node needs to sweep the second beam.

Through the beam sweeping, the second beam with the highest signal quality can be determined for the communication between the first communication node and the second communication node to improve communication quality.

In an embodiment, the method further includes:

sending a switching response carrying resource information indicating the sweeping resource in response to receiving the switching request carrying the beam sweeping request information.

Herein, the second communication node can indicate the sweeping resources for beam sweeping through the resource information carried in the switching response. The sweeping resources can include: time slot resources for frequency sweeping, frequency resources, etc.

After receiving the switching response, the first communication node determines the sweeping resources. In addition, on the sweeping resources, performing the beam sweeping by using at least one second beam, determining the second beam whose sweeping results meet a first condition as a beam for communication between the first communication node and the second communication node. Herein, the sweeping result can be signal quality parameters of the reference signal and other signals transmitted by the second communication node and determined by sweeping with the second beam, such as reference signal receiving power (RSRP).

For example, the first communication node can use the second beam to sweep to determine a second beam with the best RSRP, and use the information transmission for communication between the first communication node and the second communication node.

So, the first communication node uses the second beam for beam sweeping and determines a second beam that meets the transmission requirements. Thus, the inconsistency of the peak gain direction before and after switching due to the beam type switching may be reduced, so as to improve the signal transmission efficiency.

In an embodiment, the method further includes:

sending signal transmission indication information in response to the first communication node switching to the second beam, where the signal transmission indication information is used to indicate the power configuration for sending a signal on the second beam.

After the first communication node completes beam switching, the second communication node can also send to the first communication node the configuration of the corresponding transmission signal readjusted according to the second beam, such as signal transmission power configuration, etc. Herein, the transmission power configuration can include measurement interval time configuration of mobility management, signal transmission power configuration, etc.

The first communication node performs data communication on the second beam based on the power configuration. For example, signal measurement is performed according to the measurement interval time configured by the power configuration. Thus, the power control demand is met to further save electric quantity.

In an embodiment, the method further includes:

sending the switching response indicating that switching to the second beam is allowed in response to receiving the requested information.

The second communication node can determine whether to allow the first communication node to switch from the first beam to the second beam according to the beam change indication. For example, the second communication node can determine whether there will be interference with beams of other communication nodes, and whether to allow the first communication node to switch from the first beam to the second beam according to the width of the second beam, etc. The second communication node can also determine whether to allow the first communication node to switch from the first beam to the second beam according to its own load. For example, when the load of the second communication node is greater than the load threshold, the first communication node is not allowed to switch from the first beam to the second beam. The second communication node can also determine whether to allow the first communication node to switch from the first beam to the second beam according to the capacity of the first communication node. For example, when the beam management capacity of the first communication node is weak, that is, when the deviation between the peak gain direction of the beam before the first communication node performs beam switching and the peak gain direction of the beam after the first communication node performs beam switching is greater than or equal to the deviation threshold, and the first communication node does not carry the beam sweeping request information in the switching request, the first communication node is not allowed to switch from the first beam to the second beam.

The second communication node can send the switching response indicating that the beam switching is allowed. After receiving the switching response, the first communication node switches from the first beam to the second beam. If no switching response indicating that the beam switching is allowed is received, the beam switching may not be performed.

The following provides a specific example in combination with any of the embodiments above:

A terminal sends a request for switching a beam bandwidth to a base station. Herein, the beam bandwidth refers to the beam width. The base station judges whether to respond to the request according to the capacity reported by the terminal and a current network condition.

The terminal sends the request for switching the beam bandwidth to the base station, and the requested information also includes whether to redo the information of beam management. The terminal judges whether to do the beam management according to the beam bandwidth switching capacity of the terminal.

As shown in FIG. 5, the beam bandwidth switching capacity refers to whether the terminal ensures the consistency of the beam orientations before and after switching, that is, the peak gain directions before and after the beam bandwidth switching are basically consistent, or the peak gain is less than a certain range.

The requested information further includes switching the bandwidth information of the target beam.

Example 1 the channel condition of the terminal is good, for example, when a path loss estimated through the downlink of the base station is low, or a signal-to-noise ratio is greater than a certain value, and it is judged that the transmitted traffic is small, the terminal can apply, to the base station for wide beam switching. The specific steps are as follows:

the terminal sends a request for switching the beam bandwidth to the base station. The base station judges whether to respond to the request according to the capacity of the terminal and a current network condition.

The terminal sends a request for switching wide beam bandwidth to the base station, and the requested information further includes whether information of the beam management needs to be redone. The terminal judges whether to do the beam management according to the beam bandwidth switching capacity of the terminal. Herein, the beam bandwidth refers to the beam width.

The beam bandwidth switching capacity refers to whether the terminal ensures the consistency of the beam orientations before and after switching. That is, the peak gain directions before and after the beam bandwidth switching are basically consistent, or the peak gain is less than a certain range.

The requested information further includes switching the bandwidth information of the target beam. As shown in Table 1, the beam bandwidth information can indicate whether the target beam increases or decreases relative to the current beam width through one bit, and indicate the proportional relationship between the target beam width and the current beam width through another one bit, namely, a width change factor. Herein, the current beam and the target beam can be different in width.

The base station judges to respond to the request, and then sends a switching response to the terminal on the current beam. If it is judged that the terminal needs to redo beam management according to the requested information, the switching response further includes the resource information used by the terminal for beam management. The base station keeps the current beam unchanged.

The resource information of the beam management includes time slot resources for frequency sweeping by the terminal, frequency resources. The terminal receives the switching response from the base station and handles the response, such as closing some antenna units and switching to the corresponding target beam. If the terminal further needs to do the beam management, the terminal sweeps the downlink beam of the current base station with the target beam according to the resource information sent by the base station, and determine the optimal beam according to the sweeping results.

In an embodiment, after the terminal completes switching, the base station further needs to send a corresponding configuration parameter readjusted according to a new beam to the terminal, such as measurement interval time of mobility management.

Example 2

In another embodiment, when the current beam of the terminal is the widest beam not supported by the terminal, the channel conditions under the current beam conditions are poor, and a large amount of traffic data needs to be transmitted, the terminal can apply to the base station for narrow beam switching. The specific steps are as follows:

The terminal sends a request for switching beam bandwidth to the base station. The base station judges whether to respond to the request according to the capacity of the base station and current network conditions.

The terminal sends a request for switching beam bandwidth to the base station, and the requested information also includes whether to redo information of the beam management. The terminal judges whether to do the beam management according to the beam bandwidth switching capacity of the terminal.

The beam bandwidth switching capacity refers to that whether the terminal ensures the consistency of the beam orientations before and after switching. That is, the peak gain directions before and after the beam bandwidth switching are basically consistent, or the peak gain is less than a certain range.

The requested information further includes switching the bandwidth information of the target beam. As shown in Table 1, the beam bandwidth information can indicate whether the target beam increases or decreases relative to the current beam width through one bit, and indicate the proportional relationship between the target beam width and the current beam width through another one bit, namely, a width change factor. Herein, the current beam and the target beam can be different in width.

The base station judges to respond to the request, and then sends a switching response to the terminal on the current beam. If it is judged that the terminal needs to redo beam management according to the requested information, the switching response also includes the resource information used by the terminal for beam management, and the base station keeps the current beam unchanged. The terminal receives the switching response of the base station and handles the response. If the terminal needs to do beam management, the terminal sweeps the beam of the current base station with the target beam according to the resource information sent by the base station, and determine the optimal beam according to the sweeping results.

In an embodiment, after the terminal completes switching, the base station further needs to send a corresponding configuration parameter readjusted according to a new beam to the terminal, such as measurement interval time of mobility management.

Example 3

In another embodiment, due to the need for power saving and when the electric quantity is lower than a certain value, the terminal can apply to the base station for wide beam switching.

Example 4

In another embodiment, the terminal judges whether to apply for beam switching to the base station according to the position information, and the terminal position information can be measured according to GPS or other location measurement units. In an embodiment, when the current beam of the terminal is different from a historical beam corresponding to the measured position information, beam switching can be applied to the base station. Herein, the current beam and the historical beam can be different in width.

Figure 7:
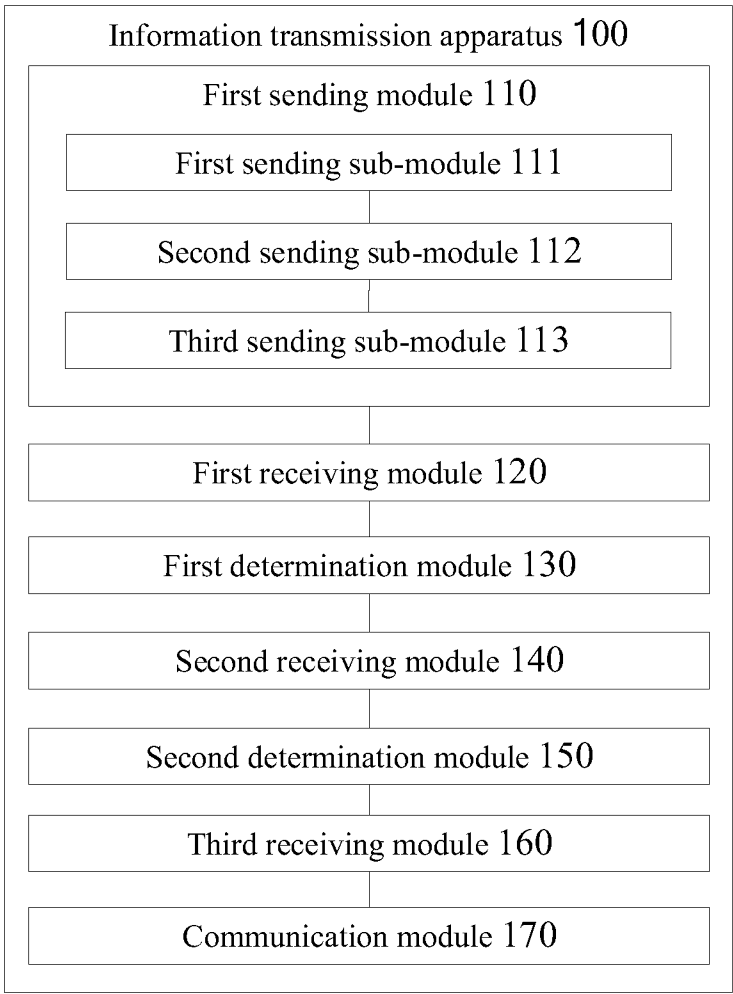
FIG. 7 is a structural block diagram of the components of an information transmission apparatus according to an example.

An embodiment of the present invention further provides an information transmission apparatus applied to a first communication node of radio communication. FIG. 7 is a schematic structural diagram of components of an information transmission apparatus 100 according to an embodiment of the present invention, and as shown in FIG. 7, the apparatus 100 includes: a first sending module 110, where the first sending module 110 is configured to send a switching request indicating switching from a first beam to a second beam to a second communication node, and the first beam is different from the second beam.

In an embodiment, the switching request includes a beam change indication for indicating a difference between the first beam and the second beam.

In an embodiment, in response to the switching request including the beam change indication, the beam change indication is used to indicate that the first beam is wider than the second beam or the first beam is narrower than the second beam.

In an embodiment, in response to the switching request including the beam change indication, the beam change indication is used for indicating a difference value between a width of the first beam and a width of the second beam.

In an embodiment, the switching request includes capacity information indicating the capacity of the first communication node.

In an embodiment, in response to the switching request including the capacity information, the capacity information indicating the capacity of the first communication node is used to indicate that the first communication node has the capacity to ensure the consistency of beam orientations before and after switching, or that the first communication node does not have the capacity to ensure the consistency of beam orientations before and after switching.

In an embodiment, the switching request includes beam sweeping request information, and the beam sweeping request information is used for requesting a sweeping resource using the second beam to perform beam sweeping.

In an embodiment, the apparatus 100 further includes:

a first receiving module 120, configured to receive a switching response carrying resource information indicating the sweeping resource and sent by the second communication node; and a first determination module 130, configured to determine the second beam whose sweeping results meet a first condition as a beam for communication between the first communication node and the second communication node by using at least one second beam to perform the beam sweeping on the sweeping resource.

In an embodiment, the apparatus 100 further includes:

a second receiving module 140, configured to receive signal transmission indication information sent by the second communication node in response to the first communication node switching to the second beam; and a second determination module 150, configured to determine a configuration for transmitting a signal on the second beam based on the signal transmission indication information.

In an embodiment, the first sending module 110 includes at least one of the following:

a first sending sub-module 111, configured to send the switching request to the second communication node in response to an electric quantity of the first communication node being lower than an electric quantity threshold;

a second sending sub-module 112, configured to send the switching request to the second communication node in response to the first communication node being at a predetermined position; and a third sending sub-module 113, configured to send the switching request to the second communication node in response to the first communication node being located at the predetermined position, and the historical beam used by the first communication node at the predetermined position being the second beam.

In an embodiment, the apparatus 100 further includes:

a third receiving module 160, configured to receive the switching response sent by the second communication node in response to the requested information, where the switching response is used to indicate that switching to the second beam is allowed; and a communication module 170, configured to communicate with the second communication node on the second beam in response to receiving the switching response.

Figure 8:
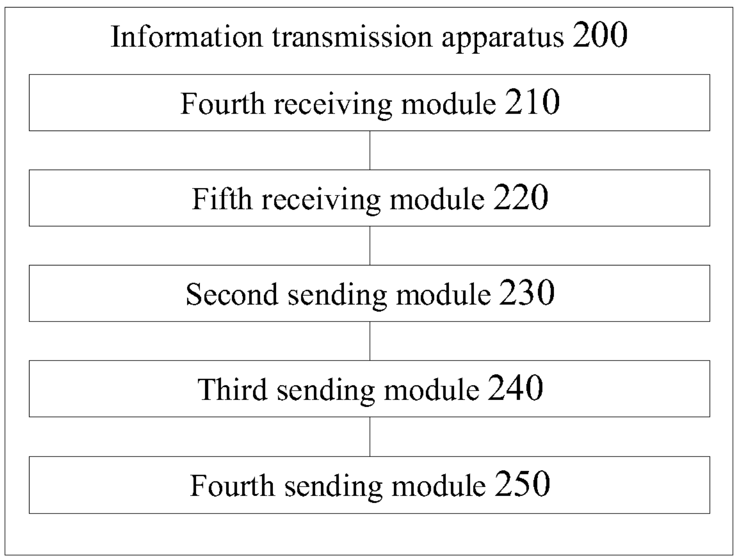
FIG. 8 is a structural block diagram of the components of another information transmission apparatus according to an example.

An embodiment of the present invention further provides an information transmission apparatus applied to a second communication node of radio communication. FIG. 8 is a schematic structural diagram of components of an information transmission apparatus 200 according to an embodiment of the present invention, and as shown in FIG. 8, the apparatus 200 includes: a fourth receiving module 210.

The fourth receiving module 210 is configured to receive a switching request indicating switching from a first beam to a second beam, the switching request is sent by a first communication node, and the first beam is different from the second beam.

In an embodiment, the switching request includes a beam change indication, and the beam change indication is used to indicate a difference between the first beam and the second beam.

In an embodiment, in response to the switching request including the beam change indication, the beam change indication is used to indicate that the first beam is wider than the second beam or the first beam is narrower than the second beam.

In an embodiment, in response to the switching request including the beam change indication, the beam change indication is used for indicating a difference value between a width of the first beam and a width of the second beam.

In an embodiment, the switching request includes capacity information indicating the capacity of the first communication node.

In an embodiment, in response to the switching request including the capacity information, the capacity information indicating the capacity of the first communication node is used to indicate that the first communication node has the capacity to ensure the consistency of beam orientations before and after switching, or that the first communication node does not have the capacity to ensure the consistency of beam orientations before and after switching.

In an embodiment, the apparatus 200 further includes:

a fifth receiving module 220, configured to receive the switching request carrying beam sweeping request information, where the beam sweeping request information is used for requesting a sweeping resource using the second beam to perform beam sweeping.

In an embodiment, the apparatus 200 further includes:

a second sending module 230, configured to send a switching response carrying resource information indicating the sweeping resource in response to receiving the switching request carrying the beam sweeping request information.

In an embodiment, the apparatus 200 further includes:

a third sending module 240, configured to send signal transmission indication information in response to the first communication node switching to the second beam, where the signal transmission indication information is used to indicate a power configuration for sending a signal on the second beam.

In an embodiment, the apparatus 200 further includes:

a fourth sending module 250, configured to send the switching response indicating that switching to the second beam is allowed in response to receiving the requested information.

In an example, the first sending module 110, the first receiving module 120, the first determination module 130, the second receiving module 140, the second determination module 150, the third receiving module 160, the communication module 170, the fourth receiving module 210, the fifth receiving module 220, the second sending module 230, the third sending module 240, the fourth sending module 250, etc., can be used by one or more central processing units (CPUs), graphics processing units (GPUs), baseband processors (BPs), application specific integrated circuits (ASICs), DSPs, programmable logic devices (PLDs), complex programmable logic devices (CPLDs), field-programmable gate arrays (FPGAs), general processor, controllers, micro controller units (MCUs), microprocessors, or other electronic elements to perform the above method.

Figure 9:
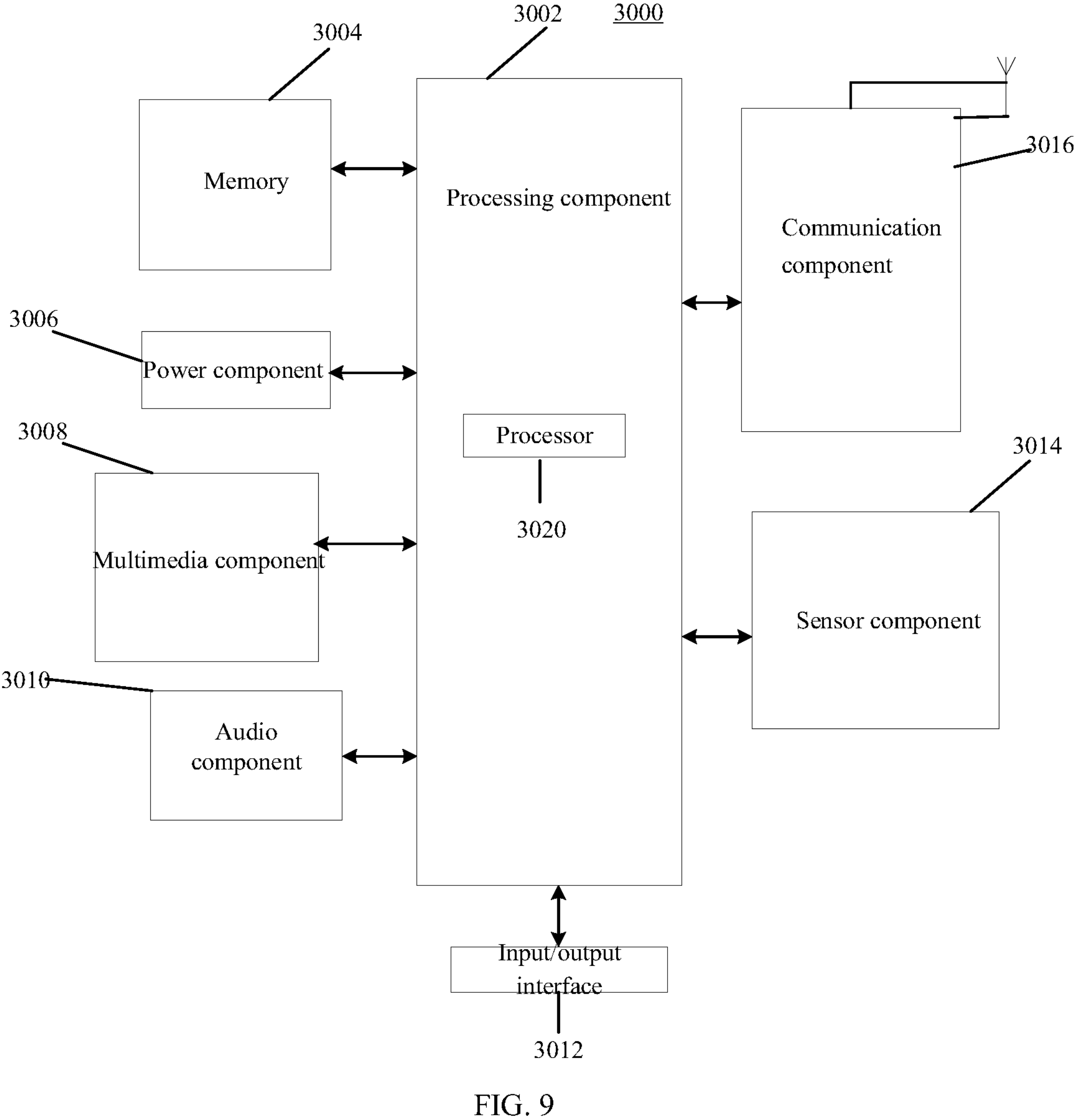
FIG. 9 is a block diagram of an apparatus for information transmission according to an example.

FIG. 9 is a block diagram of an information transmission apparatus 3000 according to an example. For example, the apparatus 3000 may be a mobile phone, a computer, a digital broadcasting terminal, a messaging device, a game console, a tablet device, a medical device, a fitness device, a personal digital assistant, etc.

Referring to FIG. 9, the apparatus 3000 may include one or more of the following components: a processing component 3002, a memory 3004, a power component 3006, a multimedia component 3008, an audio component 3010, an input/output (I/O) interface 3012, a sensor component 3014, and a communication component 3016.

The processing component 3002 usually controls the overall operations of an apparatus 3000, such as operations associated with display, telephone call, information transmission, camera operation, and recording operation. The processing component 3002 may include one or more processors 3020 to execute instructions to complete all or part of the steps of the above method. In addition, the processing component 3002 may include one or more modules to facilitate the interaction between the processing component 3002 and other components. For example, the processing component 3002 may include a multimedia module to facilitate interaction between the multimedia component 3008 and the processing component 3002.

The memory 3004 is configured to store various types of data to support the operations at the device 3000. Examples of these data include instructions for any application or method operated on the apparatus 3000, contact data, phone book data, messages, pictures, videos, etc. The memory 3004 may be implemented by any type of volatile or non-volatile storage device or a combination thereof, such as a static random access memory (SRAM), an electrically erasable programmable read-only memory (EEPROM), or an erasable. programmable read-only memory (EPROM), a programmable read-only memory (PROM), a read-only memory (ROM), a magnetic memory, a flash memory, a magnetic disk, or an optical disk.

The power component 3006 provides power for various components of the apparatus 3000. The power component 3006 may include a power management system, one or more power sources, and other components associated with power generation, management, and distribution of the apparatus 3000.

The multimedia component 3008 includes a screen for providing an output interface between the apparatus 3000 and the user. In an embodiment, the screen may include a liquid crystal display (LCD) and a touch panel (TP). If the screen includes a touch panel, the screen may be implemented as a touch screen to receive input signals from the user. The touch panel includes one or more touch sensors to sense touches, slides, and gestures on the touch panel. The touch sensor may sense not only the boundary of a touch or slide, but also the duration and pressure associated with the touch or slide. In an embodiment, the multimedia component 3008 includes a front camera and/or a rear camera. When the device 3000 is in an operation mode, such as a shooting mode or a video mode, the front camera and/or the rear camera may receive external multimedia data. Each front or rear camera may be a fixed optical lens system or have a focal length and optical zoom capability.

The audio component 3010 is configured to output and/or input an audio signal. For example, the audio component 3010 includes a microphone (MIC), and when the apparatus 3000 is in an operation mode, such as a call mode, a recording mode, and a voice recognition mode, the microphone is configured to receive external audio signals. The received audio signals may be further stored in the memory 3004 or sent by the communication component 3016. In an embodiment, the audio component 3010 further includes a speaker for outputting audio signals.

The I/O interface 3012 provides an interface between the processing component 3002 and a peripheral interface module. The peripheral interface module may be a keyboard, a click wheel, buttons, etc. These buttons may include, but are not limited to, a home button, a volume button, a start button, and a lock button.

The sensor component 3014 includes one or more sensors for providing various aspects of status assessment for the apparatus 3000. For example, the sensor component 3014 may detect an on/off state of the apparatus 3000, and relative positions of components such as a display and a keypad of the apparatus 3000. The sensor component 3014 may also detect a position change of the apparatus 3000 or one component of the apparatus 3000, the presence or absence of contact between the user and the apparatus 3000, an orientation or acceleration/deceleration of the apparatus 3000, and a temperature change of the apparatus 3000. The sensor component 3014 may include a proximity sensor configured to detect the presence of nearby objects without any physical contact. The sensor component 3014 may further include an optical sensor, such as a CMOS or CCD image sensor, for use in imaging applications. In an embodiment, the sensor component 3014 may further include an acceleration sensor, a gyroscope sensor, a magnetic sensor, a pressure sensor, or a temperature sensor.

The communication component 3016 is configured to facilitate wired or wireless communication between the apparatus 3000 and other devices. The apparatus 3000 may access a wireless network based on communication standards, such as WiFi, 2G, or 3G, or a combination thereof. In an exemplary example, the communication component 3016 receives broadcast signals or broadcast associated information from an external broadcast management system via a broadcast channel. In an example, the communication component 3016 further includes a near field communication (NFC) module to facilitate short-range communication. For example, the NFC module may be implemented based on radio frequency identification (RFID) technology, infrared data association (IrDA) technology, ultra wide band (UWB) technology, Bluetooth (BT) technology, and other technologies.

In an example, the apparatus 3000 may be implemented by one or more application specific integrated circuits (ASICs), digital signal processors (DSPs), digital signal processing devices (DSPDs), programmable logic devices (PLDs), field programmable gate arrays (FPGAs), controllers, microcontrollers, microprocessors, or other electronic elements to perform the above method.

In an example, a non-transitory computer-readable storage medium including instructions is further provided, such as a memory 3004 including instructions executable by the processor 3020 of the apparatus 3000 to complete the above method. For example, the non-transitory computer-readable storage medium may be a ROM, a random access memory (RAM), a CD-ROM, a magnetic tape, a floppy disk, an optical data storage device, etc.

A person skilled in the art would readily conceive of other implementations of the embodiments of the present disclosure after considering the specification and practicing the invention disclosed herein. The present application is intended to cover any variations, uses, or adaptive changes of the embodiments of the present disclosure. These variations, uses, or adaptive changes follow the general principle of the embodiments of the present disclosure and include common general knowledge or conventional technical means in the technical field that are not disclosed in the embodiments of the present disclosure. The specification and the embodiments are merely regarded as exemplary, and the real scope and spirit of the embodiments of the present disclosure are pointed out by the following claims.

It should be understood that the embodiments of the present disclosure are not limited to the precise structure described above and shown in the figures, and various modifications and changes can be made without departing from its scope. The scope of the embodiments of the present disclosure is only limited by the appended claims.

According to the embodiments of the present disclosure, a first communication node sends a switching request indicating switching from a first beam to a second beam to a second communication node, where the first beam is different from the second beam. So, the first communication node implements beam switching by sending a switching request. On the one hand, the first communication node can choose different beams, which are not limited to the same type of beams for communication, so as to improve the flexibility of beam selection. On the other hand, the first communication node can select a beam suitable for the current communication scenario to communicate, thereby improving the communication efficiency.

According to a first aspect of an embodiment of the present disclosure, there is provided an information transmission method applied to a first communication node, the method including:

sending a switching request indicating switching from a first beam to a second beam to a second communication node, where the first beam is different from the second beam.

In an embodiment, the switching request includes a beam change indication for indicating a difference between the first beam and the second beam.

In an embodiment, the beam change indication in the switching request is used to indicate that the first beam is wider than the second beam or the first beam is narrower than the second beam.

In an embodiment, the beam change indication in the switching request is used for indicating a difference value between a width of the first beam and a width of the second beam.

In an embodiment, the switching request includes capacity information indicating the capacity of the first communication node.

In an embodiment, the capacity information in the switching request indicating the capacity of the first communication node is used to indicate that the first communication node has the capacity to ensure the consistency of beam orientations before and after switching, or that the first communication node does not have the capacity to ensure the consistency of beam orientations before and after switching.

In an embodiment, the switching request includes beam sweeping request information, and the beam sweeping request information is used for requesting a sweeping resource using the second beam to perform beam sweeping.

In an embodiment, the method further includes:

receiving a switching response sent by the second communication node, the switching response carrying resource information indicating the sweeping resource;

Performing the beam sweeping by using at least one second beam on the sweeping resource, determining the second beam whose sweeping results meet a first condition as a beam for communication between the first communication node and the second communication node. In an embodiment, the method further includes:

in response to the first communication node switching to the second beam, receiving a signal transmission indication information, the signal transmission indication information sent by the second communication node; and determining a configuration for transmitting a signal on the second beam according to the signal transmission indication information.

In an embodiment, the step of sending a switching request to a second communication node to request a switch from a first beam to a second beam comprises at least one of the following:

sending the switching request to the second communication node in response to the electric quantity of the first communication node is lower than an electric quantity threshold;

sending the switching request to the second communication node in response to the first communication node being at a predetermined position; and sending the switching request to the second communication node in response to the first communication node being located at the predetermined position, and a historical beam used by the first communication node at the predetermined position is the second beam.

In an embodiment, the method further includes:

receiving the switching response sent by the second communication node in response to the requested information, where the switching response is used to indicate that switching to the second beam is allowed; and communicating with the second communication node on the second beam in response to receiving the switching response.

According to a second aspect of an embodiment of the present disclosure, there is provided an information transmission method applied to a second communication node, the method including:

receiving a switching request indicating switching from a first beam to a second beam, the switching request sent by a first communication node, where the first beam is different from the second beam.

In an embodiment, the switching request includes a beam change indication for indicating a difference between the first beam and the second beam.

In an embodiment, the beam change indication in the switching request is used to indicate that the first beam is wider than the second beam or that the first beam is narrower than the second beam.

In an embodiment, the beam change in the switching request indication is used for indicating a difference value between a width of the first beam and a width of the second beam.

In an embodiment, the switching request includes capacity information indicating the capacity of the first communication node.

In an embodiment, the capacity information in the switching request indicating the capacity of the first communication node is used to indicate that the first communication node has the capacity to ensure the consistency of beam orientations before and after switching, or that the first communication node does not have the capacity to ensure the consistency of beam orientations before and after switching.

In an embodiment, the method further includes:

receiving the switching request carrying beam sweeping request information, where the beam sweeping request information is used for requesting a sweeping resource using the second beam to perform beam sweeping.

In an embodiment, the method further includes:

sending a switching response carrying resource information indicating the sweeping resource in response to receiving the switching request carrying the beam sweeping request information.

In an embodiment, the method further includes:

sending signal transmission indication information in response to the first communication node switching to the second beam, where the signal transmission indication information is used to indicate the power configuration for sending a signal on the second beam.

In an embodiment, the method further includes:

sending the switching response indicating that switching to the second beam is allowed in response to receiving the requested information.

According to a third aspect of an embodiment of the present disclosure, there is provided an information transmission apparatus applied to a first communication node, the apparatus including: a first sending module.

The first sending module is configured to send a switching request indicating switching from a first beam to a second beam to a second communication node, and the first beam is different from the second beam.

In an embodiment, the switching request includes a beam change indication for indicating a difference between the first beam and the second beam.

In an embodiment, the beam change indication in the switching request is used to indicate that the first beam is wider than the second beam or the first beam is narrower than the second beam.

In an embodiment, the beam change indication in the switching request is used for indicating a difference value between a width of the first beam and a width of the second beam.

In an embodiment, the switching request includes capacity information indicating the capacity of the first communication node.

In an embodiment, the capacity information indicating the capacity of the first communication node is used to indicate that the first communication node has the capacity to ensure the consistency of beam orientations before and after switching, or that the first communication node does not have the capacity to ensure the consistency of beam orientations before and after switching.

In an embodiment, the switching request includes beam sweeping request information, and the beam sweeping request information is used for requesting a sweeping resource using the second beam to perform beam sweeping.

In an embodiment, the apparatus further includes:

a first receiving module, configured to receive a switching response carrying resource information indicating the sweeping resource and sent by the second communication node; and a first determination module, configured to determine the second beam whose sweeping results meet a first condition as a beam for communication between the first communication node and the second communication node by using at least one second beam to perform the beam sweeping on the sweeping resource.

In an embodiment, the apparatus further includes:

a second receiving module, configured to receive signal transmission indication information sent by the second communication node in response to the first communication node switching to the second beam; and a second determination module, configured to determine a configuration for transmitting a signal on the second beam based on the signal transmission indication information.

In an embodiment, the first sending module includes at least one of the following:

a first sending sub-module, configured to send the switching request to the second communication node in response to an electric quantity of the first communication node being lower than an electric quantity threshold;

a second sending sub-module, configured to send the switching request to the second communication node in response to the first communication node being at a predetermined position; and a third sending sub-module, configured to send the switching request to the second communication node in response to the first communication node being located at the predetermined position, and the historical beam used by the first communication node at the predetermined position is the second beam.

In an embodiment, the apparatus further includes:

a third receiving module, configured to receive the switching response sent by the second communication node in response to the requested information, where the switching response is used to indicate that switching to the second beam is allowed; and a communication module, configured to communicate with the second communication node on the second beam in response to receiving the switching response.

According to a fourth aspect of an embodiment of the present disclosure, there is provided an information transmission apparatus applied to a second communication node, the apparatus including: a fourth receiving module.

The fourth receiving module is configured to receive a switching request indicating switching from a first beam to a second beam, the switching request sent by a first communication node, and the first beam is different from the second beam.

In an embodiment, the switching request includes a beam change indication for indicating a difference between the first beam and the second beam.

In an embodiment, the beam change indication in the switching request is used to indicate that the first beam is wider than the second beam or the first beam is narrower than the second beam.

In an embodiment, the beam change indication in the switching request is used for indicating a difference value between a width of the first beam and a width of the second beam.

In an embodiment, the switching request includes capacity information indicating the capacity of the first communication node.

In an embodiment, the capacity information in the switching request indicating the capacity of the first communication node is used to indicate that the first communication node has the capacity to ensure the consistency of beam orientations before and after switching, or that the first communication node does not have the capacity to ensure the consistency of beam orientations before and after switching.

In an embodiment, the apparatus further includes:

A fifth receiving module, configured to receive the switching request, the switching request carrying beam sweeping request information, where the beam sweeping request information is used for requesting a sweeping resource using the second beam to perform beam sweeping.

In an embodiment, the apparatus further includes:

a second sending module, configured to send a switching response carrying resource information indicating the sweeping resource in response to receiving the switching request carrying the beam sweeping request information.

In an embodiment, the apparatus further includes:

a third sending module, configured to send signal transmission indication information in response to the first communication node switching to the second beam, where the signal transmission indication information is used to indicate power configuration for sending a signal on the second beam.

In an embodiment, the apparatus further includes:

a fourth sending module, configured to send the switching response indicating that switching to the second beam is allowed in response to receiving the requested information.

According to a fifth aspect of an embodiment of the present disclosure, there is provided a communication device, including a processor, a memory, and executable programs stored in the memory and may be executed by the processor, where when executing the executable programs, the processor performs the steps of the information transmission method according to the first aspect.

According to a sixth aspect of an embodiment of the present disclosure, there is provided a communication device, including a processor, a memory, and executable programs stored in the memory and may be executed by the processor, where when executing the executable programs, the processor performs the steps of the information transmission method according to the second aspect.

What is claimed is:

1. An information transmission method, performed by a first communication node, comprising:

sending a switching request indicating switching from a first beam to a second beam to a second communication node, wherein the first beam is different from the second beam;

wherein the switching request comprises capacity information for indicating a capacity of the first communication node, and in response to the switching request comprising the capacity information, the capacity information indicating the capacity of the first communication node is used to indicate that the first communication node has the capacity to ensure a consistency of beam orientations before and after switching, or that the first communication node does not have the capacity to ensure the consistency of beam orientations before and after switching; an wherein the method further comprises:

receiving a switching response sent by the second communication node in response to the switching request, wherein the switching response is used to indicate that switching to the second beam is allowed; and communicating with the second communication node on the second beam in response to receiving the switching response.

2. The method according to claim 1, wherein the switching request further comprises:

a beam change indication for indicating a difference between the first beam and the second beam.

3. The method according to claim 2, in response to the switching request comprising the beam change indication, the beam change indication is used for indicating one or more of:

the first beam is wider than the second beam or the first beam is narrower than the second beam; or the beam change indication is used for indicating a difference value between a width of the first beam and a width of the second beam.

4. The method according to claim 1, further comprising:

receiving a switching response sent by the second communication node, wherein the switching response carries resource information indicating the sweeping resource;

performing the beam sweeping by using at least one second beam on the sweeping resource, determining the second beam whose sweeping results meet a first condition as a beam for communication between the first communication node and the second communication node.

5. The method according to claim 1, further comprising:

receiving a signal transmission indication information sent by the second communication node in response to the first communication node switching to the second beam; and determining configuration for transmitting a signal on the second beam according to the signal transmission indication information.

6. The method according to claim 1, wherein sending the switching request to the second communication node to request a switch from the first beam to the second beam comprises at least one of:

sending the switching request to the second communication node in response to an electric quantity of the first communication node being lower than an electric quantity threshold;

sending the switching request to the second communication node in response to the first communication node being at a predetermined position; or sending the switching request to the second communication node in response to the first communication node being located at the predetermined position and a historical beam used by the first communication node at the predetermined position being the second beam.

7. The method according to claim 1, wherein the switching request further comprises:

beam sweeping request information, wherein the beam sweeping request information is used for requesting a sweeping resource using the second beam to perform beam sweeping.

8. The method according to claim 1, wherein, in response to the capacity information indicating that the first communication node has the capacity to ensure the consistency of beam orientations before and after switching, a deviation angle between a peak gain direction of the first beam and a peak gain direction of the second beam is less than or equal to a deviation threshold; or wherein, in response to the capacity information indicating that the first communication node does not have the capacity to ensure the consistency of beam orientations before and after switching, the deviation angle between the peak gain direction of the first beam and the peak gain direction of the second beam is greater than the deviation threshold.

9. The method according to claim 1, wherein the capacity of the first communication node further comprises at least one of the following:

a beam width switchable by the first communication node; or a control capacity in beam pointing in a case where the first communication node switches from the first beam to the second beam.

10. An information transmission method, performed by a second communication node, comprising:

receiving a switching request indicating switching from a first beam to a second beam, wherein the switching request is sent by a first communication node, and the first beam is different from the second beam;

wherein the switching request comprises capacity information for indicating a capacity of the first communication node, and in response to the switching request comprising the capacity information, the capacity information indicating the capacity of the first communication node is used to indicate that the first communication node has the capacity to ensure a consistency of beam orientations before and after switching, or that the first communication node does not have the capacity to ensure the consistency of beam orientations before and after switching, and wherein the method further comprises sending a switching response indicating that switching to the second beam is allowed in response to receiving the switching request.

11. The method according to claim 10, wherein the switching request further comprises:

a beam change indication for indicating a difference between the first beam and the second beam.

12. The method according to claim 11, in response to the switching request comprising the beam change indication, the beam change indication is used for indicating one or more of:

the first beam is wider than the second beam or the first beam is narrower than the second beam; or the beam change indication is used for indicating a difference value between a width of the first beam and a width of the second beam.

13. The method according to claim 10, further comprising:

sending signal transmission indication information in response to the first communication node switching to the second beam, wherein the signal transmission indication information is used to indicate configuration for transmitting a signal on the second beam.

14. A communication device, comprising a memory that stores executable programs; and a processor that is communicatively coupled to the processor, wherein the processor is configured to perform the method according to claim 10.

15. The method according to claim 10, wherein the switching request further comprises:

beam sweeping request information, wherein the beam sweeping request information is used for requesting a sweeping resource using the second beam to perform beam sweeping.

16. The method according to claim 15, further comprising:

sending a switching response carrying resource information indicating a sweeping resource in response to receiving the switching request carrying the beam sweeping request information.

17. The method according to claim 15, further comprising:

determining, based on the capacity information for indicating the capacity of the first communication node, whether beam management is to be performed again; and sending, in response to the capacity information indicating that the beam management is to be performed again, a switching request carrying beam sweeping request information to the second communication node, wherein the beam sweeping request information is used for requesting the beam management from the second communication node.

18. A communication device, comprising a memory that stores executable programs; and a processor that is communicatively coupled to the memory, wherein the processor is configured to:

send a switching request indicating switching from a first beam to a second beam to a second communication node, wherein the first beam is different from the second beam;

wherein the switching request comprises capacity information for indicating a capacity of the first communication node, and in response to the switching request comprising the capacity information, the capacity information indicating the capacity of the first communication node is used to indicate that the first communication node has the capacity to ensure a consistency of beam orientations before and after switching, or that the first communication node does not have the capacity to ensure the consistency of beam orientations before and after switching; and wherein the processor is further configured to:

receive a switching response sent by the second communication node in response to the switching request, wherein the switching response is used to indicate that switching to the second beam is allowed; and communicate with the second communication node on the second beam in response to receiving the switching response.

19. The communication device according to claim 18, wherein the switching request further comprises:

a beam change indication for indicating a difference between the first beam and the second beam.

20. The communication device according to claim 19, wherein in response to the switching request comprising the beam change indication, the beam change indication is used for indicating one or more of:

the first beam is wider than the second beam or the first beam is narrower than the second beam; or the beam change indication is used for indicating a difference value between a width of the first beam and a width of the second beam.

* * * * *